United States Patent [19]

Hunter

[11] 4,406,799
[45] Sep. 27, 1983

[54] PROCESS FOR SECONDARY RECOVERY

[75] Inventor: Walter D. Hunter, Houston, Tex.

[73] Assignee: Texaco Development Corp., White Plains, N.Y.

[21] Appl. No.: 372,598

[22] Filed: Apr. 28, 1982

Related U.S. Application Data

[60] Division of Ser. No. 233,428, Feb. 11, 1981, Pat. No. 4,343,712, which is a continuation-in-part of Ser. No. 75,635, Sep. 14, 1979, abandoned.

[51] Int. Cl.³ .............................................. E21B 43/22
[52] U.S. Cl. ............................... 252/8.55 D; 166/275; 525/328.5
[58] Field of Search ................ 252/8.55 D; 166/275; 525/328.5

[56] References Cited

U.S. PATENT DOCUMENTS

| | | | |
|---|---|---|---|
| 2,808,397 | 10/1957 | Stroh et al. ..................... | 525/385 X |
| 2,827,964 | 3/1958 | Sandiford et al. ............. | 252/8.55 X |
| 3,039,529 | 6/1962 | McKennon ..................... | 252/8.55 X |
| 3,079,336 | 2/1963 | Stright et al. .................. | 252/8.55 X |
| 3,709,297 | 1/1973 | Christopher et al. ............... | 166/275 |
| 3,804,173 | 4/1974 | Jennings ................................. | 166/275 |
| 4,044,831 | 8/1977 | Allen ..................................... | 166/275 |
| 4,218,326 | 8/1980 | Crouch et al. ....................... | 252/8.55 |

Primary Examiner—Herbert B. Guynn
Attorney, Agent, or Firm—Jack H. Park; Walter D. Hunter; Richard A. Morgan

[57] ABSTRACT

Hydrocarbons are recovered from a subterranean hydrocarbon-bearing formation penetrated by an injection well and a production well by displacing hydrocarbons toward the production well using a drive fluid such as water thickened with a copolymer of acrylamide and vinyl sulfonic acid or salts thereof or with a copolymer of acrylamide and styrene sulfonic acid or salts thereof as well as these same copolymers alkoxylated with an alkylene oxide. Optionally, the drive fluid can be saturated with carbon dioxide, nitrogen, natural gas or mixtures of these gases.

6 Claims, No Drawings

PROCESS FOR SECONDARY RECOVERY

This application is a division of application Ser. No. 233,428, filed Feb. 11, 1981, now U.S. Pat. No. 4,343,712, which in turn is a continuation-in-part of application Ser. No. 75,635, filed Sept. 14, 1979, now abandoned.

BACKGROUND OF THE INVENTION

1. Field of the Invention

This invention relates to a process for recovering hydrocarbons from a subterranean hydrocarbon-bearing formation penetrated by an injection well and a production well wherein a drive fluid such as water thickened with a copolymer of acrylamide and vinyl sulfonic acid or the sodium salts thereof or with a copolymer of acrylamide and styrene sulfonic acid or salts as well as these same copolymers alkoxylated with an alkylene oxide, potassium or ammonium salt thereof is utilized to displace hydrocarbons in the formation toward a production well. The drive fluid employed can be saturated with carbon dioxide, nitrogen or natural gas or mixtures thereof.

2. Prior Art

The production of petroleum products is usually accomplished by drilling into a hydrocarbon-bearing formation and utilizing one of the well-known recovery methods for the recovery of hydrocarbons. However, it is recognized that these primary recovery techniques may recover only a minor portion of the petroleum products present in the formation particularly when applied to reservoirs of viscous crudes. Even the use of improved recovery practices involving heating, miscible flooding, water flooding and steam processing may still leave up to 70–80 percent of the original hydrocarbons in place.

Thus, many large reserves of petroleum fluids from which only small recoveries have been realized by present commercial recovery methods, are yet to reach a potential recovery approaching their estimated oil-in-place.

Water flooding is one of the more widely practiced secondary recovery methods. A successful water flood may result in recovery of 30–50 percent of the original hydrocarbons left in place. However, generally the application of water flooding to many crudes results in much lower recoveries.

The newer development in recovery methods for heavy crudes is the use of steam injection which has been applied in several modifications, including the "push-pull" technique and through-put methods, and has resulted in significant recoveries in some areas. Crude recovery of this process is enhanced through the beneficial effects of the drastic viscosity reduction that accompanies an increase in temperature. This reduction in viscosity facilitates the production of hydrocarbons since it improves their mobility, i.e., it increases their ability to flow.

However, the application of these secondary recovery techniques to depleted formations may leave major quantities of oil-in-place, since the crude is tightly bound to the sand particles of the formation, that is, the sorptive capacity of the sand for the crude is great. In addition, interfacial tension between the immiscible phases results in entrapping crude in the pores, thereby reducing recovery. Another disadvantage is the tendency of the aqueous drive fluid to finger, since its viscosity is considerably less than that of the crude, thereby reducing the efficiency of the processes. Another disadvantage is the tendency of the aqueous drive fluid to remove additional gas by diffusion from the in-place oil thus further reducing the already lowered formation oil volume and increasing the viscosity of the oil.

There is a definite need in the art for a water flooding process in which the disadvantages discussed above are largely eliminated or avoided.

SUMMARY OF THE INVENTION

This invention relates to a process for recovering hydrocarbons from a subterranean hydrocarbon-bearing formation penetrated by an injection well and a production well which comprises:

(A) injecting into the formation via an injection well a drive fluid comprising water having dissolved therein a small amount of a copolymer selected from the group consisting of a copolymer of acrylamide and vinyl sulfonic acid (Polymer A) or the sodium, potassium or ammonium salt thereof and a copolymer of acrylamide and styrene sulfonic acid (Polymer B) or the sodium, or ammonium salt thereof, (B) forcing the said fluid through the formation and (C) recovering hydrocarbons through the production well.

In another embodiment of this invention the drive fluid may comprise water or brine having dissolved therein a small amount, i.e., about 0.01 to about 5.0 weight percent of Polymer A, B or C alkoxylated with about 2 to about 150 weight percent and preferably from about 20 to about 80 weight percent of a material selected from the group consisting of:

(a) ethylene oxide, and (b) a mixture of ethylene oxide and propylene oxide wherein in the said mixture the weight percent of ethylene oxide is about 60 to about 95.

An additional embodiment of this invention relates to the driving fluid compositions utilized in step (A).

DETAILED DESCRIPTION OF THE INVENTION

Prior to practicing the process of this invention it is sometimes desirable to open up a communication path through the formation by a hydraulic fracturing operation. Hydraulic fracturing is a well-known technique for establishing a communication path between an injection well and a production well. Fracturing is usually accomplished by forcing a liquid such as water, oil or any other suitable hydrocarbon fraction into the formation at pressure of from about 300 to about 3000 psig which are sufficient to rupture the formation and to open up channels therein. By use of this method it is possible to position the fracture at any desired vertical location with respect to the bottom of the oil-filled zone. It is not essential that the fracture planes be horizontally oriented, although it is, of course, preferably that they be. After the fracture has been established, and without diminishing the fracture pressure, a propping agent may be injected into the fraction in order to prevent healing of the fracture which would destroy its usefulness for fluid flow communication purposes. Gravel, metal shot, glass beads, sand, etc. and mixtures thereof are generally employed as propping agents. When sand is utilized as the propping agent particles having a Tyler mesh size of from about 8 to about 40 are preferred (i.e., from about 0.016 to about 0.093 inches).

The copolymers of acrylamide and vinyl sulfonic acid (Polymer A) employed in this invention comprise recurring E-type units of the formula:

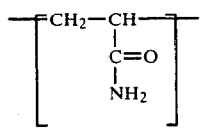

and recurring F-type units of the formula:

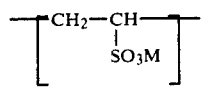

wherein M is selected from the group consisting of hydrogen, sodium, potassium and ammonium and wherein in the said copolymer the weight percent of the E-type units ranges from about 65 to about 95 with the balance being F-type units. Generally, the number average molecular weight of the acrylamide-vinyl sulfonic acid copolymers will range from about 10,000 to about 5,000,000 or more. The copolymers of acrylamide-vinyl sulfonic acid and salts thereof are known materials which can be prepared by the usual vinyl compound polymerization methods. Preparation of such acrylamide-vinyl sulfonic acid polymers is described in detail in Norton et al U.S. Pat. No. 3,779,917 which is incorporated herein in its entirety by reference.

The copolymers of acrylamide and styrene sulfonic acid (Polymer B) utilized in this invention comprise recurring G-type units of the formula:

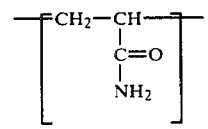

and recurring H-type units of the formula:

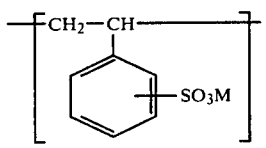

wherein M is selected from the group consisting of hydrogen, sodium, potassium and ammonium and wherein in the said copolymer the weight percent of G-type units ranges from about 70 to about 95 with the balance being H-type units. Generally, the number average molecular weight of the acrylamide-styrene sulfonic acid copolymers will range from about 50,000 to about 5,000,000 or more. The preparation of acrylamide-styrene sulfonic acid polymers is described in detail in Jahnke U.S. Pat. No. 3,892,720 and in Jennings U.S. Pat. No. 3,804,173 which are incorporated herein in their entirety by reference.

The alkoxylated copolymers of acrylamide and vinyl sulfonic acid or salts thereof and the alkoxylated copolymers of acrylamide and styrene sulfonic acid or salts thereof useful as thickening agents in the drive fluids of this invention comprise the respective copolymers or salts thereof alkoxylated with from about 2 to about 150 weight percent of ethylene oxide or with a mixture of ethylene oxide and propylene oxide wherein the weight percent of ethylene oxide in the said mixture is about 60 to about 95.

Alkoxylation of the acrylamide-vinyl sulfonic acid copolymers and of the acrylamide-styrene sulfonic acid copolymers can be conveniently conducted using methods will know in the art. For example, a solution of the copolymer comprising about 10 to about 30 weight percent or more of the copolymer in water or any other suitable solvent along with about 0.5 weight percent or more of powdered potassium hydroxide or sodium hydroxide is charged to an autoclave and the autoclave and contents heated to a temperature of about 100° C. to about 200° C. after which the required weight of the alkylene oxide is pressured into the reactor with nitrogen over a period of 1 to 3 hours or more following which the autoclave is cooled to room temperature and vented. The reaction product remaining after being stripped to a remove volatile material yields the water-soluble, alkoxylated copolymer. In another variation, the copolymer is reacted under pressure with a suitable glycol halohydrin to accomplish the alkoxylation.

A number of other methods are described in the art for conducting such alkoxylation reactions including those disclosed in U.S. Pat. Nos. 2,213,447; 2,233,381; 2,131,142; 2,808,397; 3,879,475; 2,425,845 and 3,062,747, etc.

In the secondary recovery process of this invention, generally the aqueous drive fluid will contain dissolved therein from about 0.01 to about 5.0 weight percent of more of the acrylamide-vinyl sulfonic acid copolymer, the acrylamide-styrene sulfonic acid copolymer or these same copolymers alkoxylated with about 2 to about 150 weight percent of ethylene oxide or a mixture of ethylene oxide and propylene oxide where the said mixture contains about 60 to about 95 weight percent of ethylene oxide. If desired, the aqueous drive fluids previously described may be saturated with carbon dioxide, nitrogen, natural gas or mixtures thereof at the injection pressure which generally will be from about 300 to about 3000 psig or more. The carbon dioxide and nitrogen when included in the fluid, serve to reduce the viscosity of the in-place oil thus making it less difficult to displace the oil toward the production well. The addition of natural gas to the drive fluid tends to aid in maintaining the gas saturation of the reservoir and thus prevents at least to some extent any reduction in viscosity of the oil caused by such gas depletion.

If desired, the aqueous drive fluids having dissolved therein one or more of the above-described polymeric thickening agents may be made alkaline by addition of an alkaline agent. The advantageous results achieved with the aqueous alkaline medium used in the process of this invention are believed to be derived from the wettability improving characteristics of the alkaline agent.

Useful alkaline agents include compounds selected from the group consisting of alkali metal hydroxides, alkaline earth metal hydroxides, and the basic salts of the alkali metal or alkaline earth metals which are capable of hydrolyzing in an aqueous medium to give an alkaline solution. The concentration of the alkaline agent employed in the drive fluid is generally from about 0.005 to about 0.3 weight percent. Also, alkaline materials such as sodium hypochlorite are highly effective as alkaline agents. Examples of these especially useful alkaline agents include sodium hydroxide, potassium hydroxide, lithium hydroxide, ammonium hydroxide, sodium hypochlorite, potassium hypochlorite, sodium carbonate and potassium carbonate.

A wide variety of surfactants such as linear alkylaryl sulfonates, alkyl polyethoxylated sulfates, etc. may also be included as a part of the aqueous drive fluid compositions previously described. Generally about 0.001 to about 1.0 or more weight percent of the surfactant will be included in the drive fluid.

This invention is best understood by reference to the following example which is offered only as an illustrative embodiment of this invention and is not intended to be limitative.

EXAMPLE I

In a filed in which the primary production has already been exhausted, an injection well is completed in the hydrocarbon-bearing formation and perforations are formed between the interval of 9860–5875 feet. A production well is drilled approximately 430 feet distance from the injection well, and perforations are similarly made in the same hydrocarbon-bearing formation at 5845–5880 feet.

The hydrocarbon-bearing formation in both the injection well and the production well is hydraulically fractured using conventional techniques, and a gravel-sand mixture is injected into the fracture to hold it open and prevent healing of the fracture.

In the next step water saturated with nitrogen at a pressure of about 1320 psig at a temperature of 60° F. to which there has been added about 0.14 weight percent sodium hydroxide and containing dissolved therein 0.32 weight percent of an acrylamide-styrene sulfonic acid copolymer having a number average molecular weight of about 280,000 alkoxylated with about 25 weight percent of ethylene oxide prepared in the manner previously described above is injected via the injection well into the formation at a pressure of 1320 psig and at the rate of 1.15 barrels per minute. In the acrylamide-styrene sulfonic copolymer the weight percent of the acrylamide units is about 85 with the balance being styrene sulfonic acid units. Injection of the driving fluid is continued at the rate of about 1.15 barrels per minute and at the end of 78 days the rate of production of oil is substantially greater than with water injection alone.

EXAMPLE II

An injection well is drilled and completed in the hydrocarbon-bearing formation of a Berea field in which primary production has been exhausted and perforations are formed between the interval of 6125–6142 feet. A production well is drilled approximately 410 feet distance from the injection well, and perforations are similarly made in the same hydrocarbon-bearing formation at 6128–6145 feet.

The formation in both the injection well and the production well is hydraulically fractured using conventional techniques and employing the usual gravel-sand mixture as a propant to hold open the fracture.

Next, water saturated with carbon dioxide at a pressure of about 1150 psig at a temperature of 65° F. and containing dissolved therein 0.61 weight percent of an acrylamide-sodium vinyl sulfonate copolymer having a number average molecular weight of about 820,000 prepared in the manner described in Norton et al. U.S. Pat. No. 3,779,917 and also containing dissolved therein 0.20 weight percent of an acrylamide-styrene sulfonic acid copolymer having a number average molecular weight of about 139,000 alkoxylated with about 65 weight percent of a mixture consisting of ethylene oxide (87 weight percent) and propylene oxide (13 weight percent) is injected via the injection well into the formation at a pressure of about 1150 psig and at the rate of 1.2 barrels per minute. In the acrylamide-styrene sulfonic acid copolymer the weight percent of the acrylamide units is about 90 with the balance being the styrene sulfonic acid units. Injection of the driving fluid is continued at the rate of 1.05 barrels per minute and at the end of 85 days the rate of production of oil is substantially greater than with water injection alone.

In some instances it may be desirable to include in the drive fluid an agent to prevent degradation of the thickening agent, i.e., the copolymers previously described by bacterial action. Therefore, if desired, the drive fluid may contain along with the acrylamide-vinyl sulfonic acid copolymer, the acrylamide-styrene sulfonic acid copolymer or oxyalkylated derivatives thereof or any other suitable thickening agent from about 0.01 to about 5.0 weight percent or more of, for example, of a water-soluble terpolymer comprising recurring E-type units of the formula:

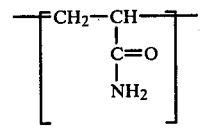

recurring F-type units of the formula:

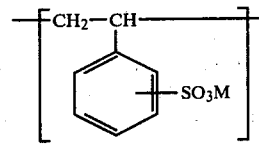

and recurring G-type units of the formula:

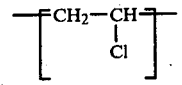

wherein M is selected from the group consisting of hydrogen, sodium, potassium and ammonia and wherein in the said terpolymer the weight percent of the E-type units ranges from about 60 to about 95, the weight percent of the G-type units ranges from about 2 to about 10 and with the balance being the F-type units. Generally, the number average molecular weight of the above-described terpolymers will range from about 50,000 to about 8,000,000 or more. These terpolymers can be prepared by the usual vinyl compound polymerization methods. Such methods are more completely described in detail in Norton et al U.S. Pat. No. 3,779,917 and in Jahnke U.S. Pat. No. 3,892,720 both of which patents are incorporated herein in their entirety by reference. These same terpolymers may be employed as the sole thickening agent in the drive fluid. Also, the above-described acrylamide-styrene sulfonic acid or sodium, potassium or ammonium salt thereof can be alkoxylated, i.e., reacted with about 2 to about 150 weight percent of ethylene oxide or with a mixture of ethylene oxide and propylene oxide wherein the weight percent of ethylene oxide in the mixture ranges from about 60 to about 95 to form an alkoxylated terpolymer useful by itself or with other thickening agents in amounts of from about 0.01 to about 5.0 weight percent in the drive fluids of this invention. The alkoxylation of the terpolymers can be conducted in the same manner as previously described for the alkoxylation of the copolymers.

The following example illustrates the preparation of an alkoxylated acrylamide-sodium styrene sulfonate-vinyl chloride terpolymer.

EXAMPLE III

A total of 430 cc of water, 5 g. of powdered potassium hydroxide and 58 g of polyacrylamide-sodium styrene sulfonate-vinyl chloride terpolymer (number average molecular weight of about 2,000,000, 80 weight percent acrylamide, 5 weight percent vinyl chloride and 15 weight percent sodium styrene sulfonate) are added to an autoclave which is then heated to a temperature of 130° C. Ethylene oxide in the amount of 63 g. is added to the autoclave under nitrogen pressure over a 1.1 hour period during which time the temperature of the autoclave is maintained is 130° C. Next, the autoclave and contents are allowed to cool to room temperature after which the autoclave is vented. The reaction mixture is then stripped of volatiles using a nitrogen purge. The resulting water-soluble product is the acrylamide-sodium styrene sulfonate-vinyl chloride terpolymer alkoxylated with about 90 weight percent of ethylene oxide.

EXAMPLE IV

In a field in which the primary production has already been exahusted, an injection well is completed in the hydrocarbon-bearing formation and perforations are formed between the interval of 5050-5070 feet. A production well is drilled approximately 415 feet distance from the injection well, and perforations are similarly made in the same hydrocarbon-bearing formation at 5055-5075 feet.

The hydrocarbon-bearing formation in both the injection well and the production well is hydraulically fractured using conventional techniques, and a gravel-sand mixture is injected into the fracture to hold it open and prevent healing of the fracture.

In the next step water saturated with carbon dioxide at 1210 psig at a temperature of 70° F. containing dissolved therein about 0.74 weight percent of a nonionic surfactant of the formula:

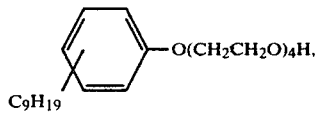

and containing dissolved therein 0.50 weight percent of an acrylamide-sodium styrene sulfonate-vinyl chloride terpolymer (78 weight percent acrylamide, 17 weight percent sodium styrene sulfonate and 6 weight percent vinyl chloride-number average molecular weight of about 2,850,000) alkoxylated with about 48 weight percent of ethylene oxide prepared in the manner previously described in Example III above in injected via the injection well into the formation at a pressure of about 1210 psig and at the rate of 1.2 barrels per minute. Injection of the driving fluid is continued at the rate of about 1.2 barrles per minute and at the end of 83 days the rate of production of oil is substantially greater than with water injection alone.

I claim:

1. A process for recovering hydrocarbons from a subterranean hydrocarbon-bearing formation penetrated by an injection well and a production well which comprises:
   (A) injecting into the formation via an injection well a drive fluid comprising water having dissolved therein about 0.01 to about 5.0 weight percent of an alkoxylated terpolymer of number average molecular weight of about 50,000 to about 8,000,000 comprising recurring E-type units of the formula:

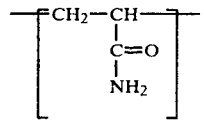

recurring F-type units of the formula:

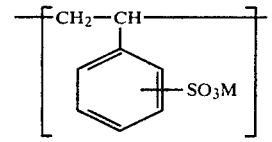

and recurring G-type units of the formula:

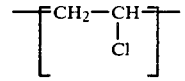

wherein M is selected from the group consisting of hydrogen, sodium, potassium and ammonia and wherein in the said terpolymer the weight percent of the E-type units ranges from about 60 to about 95, the weight percent of the G-type units ranges from about 2 to about 10 and with the balance being the F-type units; said terpolymer being alkoxylated with about 2 to about 150 weight percent of a material selected from the group consisting of ethylene oxide and a mixture of ethylene oxide and propylene oxide wherein the weight percent of ethylene oxide in the said mixture is about 60 to about 95.
   (B) forcing the said fluid through the formation, and
   (C) recovering hydrocarbons through the production well.

2. The process of claim 1 wherein the said drive fluid contains a surfactant.

3. The process of claim 1 wherein the said drive fluid is saturated with carbon dioxide at a pressure of about 300 to about 3000 psig.

4. The process of claim 1 wherein the said drive fluid is saturated with natural gas at a pressure of about 300 to 3000 psig.

5. The process of claim 1 wherein the said drive fluid is saturated with nitrogen at a pressure of about 300 to about 3000 psig.

6. The process of claim 1 wherein the said drive fluid includes about 0.005 to 0.3 weight percent of an alkaline agent selected from the group consisting of sodium hydroxide, potassium hydroxide and sodium hypochlorite.

* * * * *